(12) United States Patent
Ghosh et al.

(10) Patent No.: US 10,331,604 B2
(45) Date of Patent: Jun. 25, 2019

(54) USB HOST-TO-HOST AUTO-SWITCHING

(71) Applicant: Microchip Technology Incorporated, Chandler, AZ (US)

(72) Inventors: Atish Ghosh, Austin, TX (US); Rekha Edamalapati, Korattur (IN); Vinoth Sekar, Nookampalayam (IN)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/901,937

(22) Filed: Feb. 22, 2018

(65) Prior Publication Data

US 2018/0336154 A1 Nov. 22, 2018

(30) Foreign Application Priority Data

May 17, 2017 (IN) .............................. 201711017227

(51) Int. Cl.
*G06F 13/40* (2006.01)
*G06F 13/42* (2006.01)

(52) U.S. Cl.
CPC ...... *G06F 13/4068* (2013.01); *G06F 13/4027* (2013.01); *G06F 13/4045* (2013.01); *G06F 13/4282* (2013.01); *G06F 2213/0042* (2013.01); *G06F 2213/4004* (2013.01)

(58) Field of Classification Search
None
See application file for complete search history.

(56) References Cited

U.S. PATENT DOCUMENTS

| | | | | |
|---|---|---|---|---|
| 7,478,191 | B2 | 1/2009 | Wurzburg et al. | 710/316 |
| 7,480,753 | B2 * | 1/2009 | Bohm | G06F 13/4022 710/104 |
| 7,523,243 | B2 | 4/2009 | Bohm et al. | 710/305 |
| 7,627,708 | B2 | 12/2009 | Bohm et al. | 710/305 |
| 7,895,386 | B2 * | 2/2011 | Chen | G06F 13/426 710/104 |
| 8,447,890 | B1 * | 5/2013 | LeTourneur | G06F 13/4022 710/305 |
| 9,244,876 | B2 * | 1/2016 | Pedro | G06F 13/4077 |

(Continued)

FOREIGN PATENT DOCUMENTS

| | | | | |
|---|---|---|---|---|
| EP | 3291098 A1 * | 3/2018 | | G06F 13/4282 |
| WO | 2007/147114 A2 | 12/2007 | | G06F 13/40 |
| WO | 2015/081448 A1 | 6/2015 | | H04L 12/12 |

OTHER PUBLICATIONS

Universal Serial Bus Specification, Revision 2.0, XP001544046, 650 pages, Apr. 27, 2000.

(Continued)

*Primary Examiner* — Steven G Snyder
(74) *Attorney, Agent, or Firm* — Slayden Grubert Beard PLLC

(57) ABSTRACT

A universal serial bus (USB) hub includes an upstream port configured to be communicatively coupled to a USB host, a downstream port, and a USB hub core circuit. The circuit is configured to determine a detachment from the downstream port, determine whether a USB element has reattached to the downstream port in USB mode, and, based on a determination that the USB element has reattached to the downstream port in USB host mode, perform USB multi-host bridging for the USB host and the USB element.

22 Claims, 2 Drawing Sheets

(56) References Cited

U.S. PATENT DOCUMENTS

| | | | | |
|---|---|---|---|---|
| 9,460,037 B2* | 10/2016 | Voto | ................... | G06F 13/4282 |
| 9,619,420 B2* | 4/2017 | Voto | ................... | G06F 13/4282 |
| 10,162,788 B2* | 12/2018 | Shetty | ................. | G06F 13/4282 |
| 2004/0019732 A1 | 1/2004 | Overtoom et al. | ........... | 710/313 |
| 2004/0148451 A1 | 7/2004 | Lai et al. | ...................... | 710/316 |
| 2006/0227759 A1* | 10/2006 | Bohm | ................ | G06F 13/4022 |
| | | | | 370/351 |
| 2007/0180181 A1* | 8/2007 | Chen | ................... | G06F 13/4022 |
| | | | | 710/313 |
| 2007/0255885 A1* | 11/2007 | Bohm | ................ | G06F 13/4022 |
| | | | | 710/316 |
| 2009/0106474 A1* | 4/2009 | Bohm | ................... | G06F 13/385 |
| | | | | 710/309 |
| 2013/0019035 A1 | 1/2013 | Chang | ............................ | 710/63 |
| 2014/0181350 A1* | 6/2014 | Pedro | ................. | G06F 13/4072 |
| | | | | 710/313 |
| 2015/0089092 A1 | 3/2015 | Voto et al. | ...................... | 710/14 |
| 2016/0132448 A1* | 5/2016 | Maung | ................. | G06F 13/366 |
| | | | | 710/104 |
| 2016/0371213 A1 | 12/2016 | Voto et al. | .................... | 710/313 |
| 2017/0004103 A1* | 1/2017 | Voto | ................... | G06F 13/4282 |
| 2017/0168974 A1* | 6/2017 | Voto | ................... | G06F 13/4282 |
| 2017/0329733 A1* | 11/2017 | Lin | ...................... | G06F 13/385 |
| 2018/0052799 A1* | 2/2018 | Shetty | ................. | G06F 13/4282 |

OTHER PUBLICATIONS

International Search Report and Written Opinion, Application No. PCT/US2018/029723, 11 pages, dated Jul. 12, 2018.

* cited by examiner

USB HOST-TO-HOST AUTO-SWITCHING

RELATED PATENT APPLICATION

This application claims priority to IN Patent Application No. 201711017227; filed May 17, 2017, which is hereby incorporated by reference herein for all purposes.

TECHNICAL FIELD

The present disclosure relates to serial communication in electronic devices and, more particularly, to automatically switching to host-to-host mode in USB communications.

BACKGROUND

The Universal Serial Bus (USB) allows coupling of peripheral devices to a computer system. USB is a serial cable bus for data exchange between a host computer and a wide range of simultaneously accessible devices. The bus allows peripherals to be attached, configured, used, and detached while the host is in operation. For example, USB printers, scanners, digital cameras, storage devices, card readers, etc. may communicate with a host computer system over USB. USB based systems may require that a USB host controller be present in the host system, and that the operating system (OS) of the host system support USB and USB Mass Storage Class Devices.

USB devices may communicate over the USB bus at low-speed (LS), full-speed (FS), or high-speed (HS). A connection between the USB device and the host may be established via digital interconnect such as Interchip USB, ULPI, UTMI, etc., or via a four wire interface that includes a power line, a ground line, and a pair of data lines D+ and D−. When a USB device connects to the host, the USB device may first pull a D+ line high—or the D− line if the device is a low speed device—using a pull up resistor on the D+ line. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

A USB hub may be coupled to a USB host controller to allow multiple USB devices to be coupled to the host system through the USB host controller. In addition, other USB hubs may be coupled to the USB hub to provide additional USB device connections to the USB host controller. In general, the USB specification is structured so that every device is configured and accessed by a single host controller. Consumers typically desire maximum flexibility, and may want to have a simple means by which to cheaply share devices. There are several switching devices that currently allow a device to be switched between multiple USB Host controllers, but the device can generally be configured and accessed by only a single host at any given time. There also exist stand-alone USB switches that provide the capability of switching a device between upstream USB Host Controllers. These solutions, however, fail to permit simultaneous access to the USB device that is downstream of the hub or switch. The USB device is typically accessed by one single host at a time, and when access to the USB device is switched, the device must be re-configured, thereby losing internal state information.

DETAILED DESCRIPTION

Figure 1:
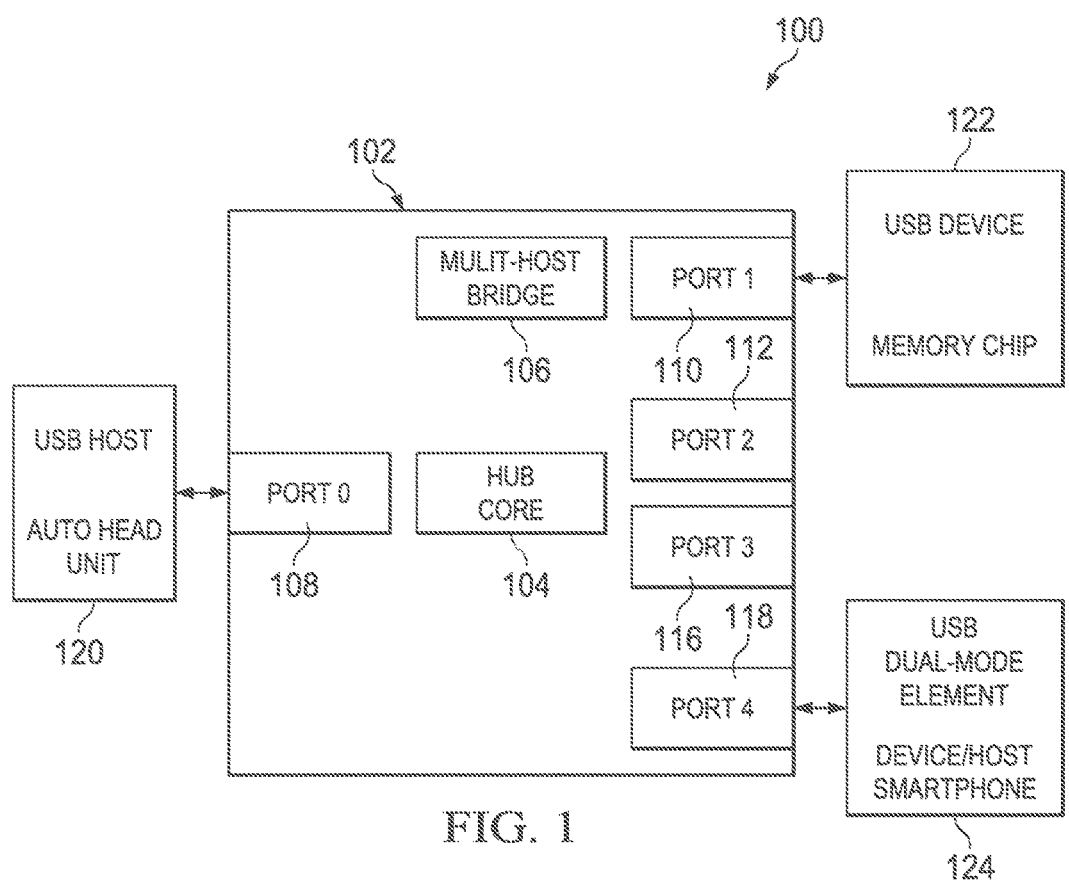
FIG. 1 is an illustration of a system for automatic switching of USB operation, according to embodiments of the present disclosure.

FIG. 1 is an illustration of an example system 100 for automatically switching operational modes of USB, according to embodiments of the present disclosure. Such automatic switching may include selectively enabling or disabling USB host-to-host translation, interpretation, or any other suitable communication. The operational modes of USB may include USB host-to-device or host-to-host communication. The USB communication may be facilitated by, for example, a USB hub 102.

USB communication according to USB standards requires that when two elements are connected using USB for end-to-end communication, one such element will act as a USB host and the other such element will act as a USB device. In contrast, system 100 may facilitate the use of multiple such elements in USB host mode. Accordingly, in system 100 a USB device might be shared by multiple USB hosts, or multiple USB hosts may be in communication with one another. Example implementations of such multi-host USB operation may be found, for example, in U.S. Pat. Nos. 7,478,191; 7,627,708; and 7,523,243.

System 100 may include a USB hub 102. The control and operation of hub 102 may be implemented using control logic, digital circuitry, analog circuitry, and a processor, microcontroller, or other execution unit for processing instructions. The instructions, when loaded into memory and executed by the processor, may cause or configure hub 102 to perform the functionality described herein. The processor, control logic, and circuitry may be included in a hub core 104. Core 104 may determine how USB communication is to be performed by hub 102.

Hub 102 may include any suitable number and kind of ports. For example, hub 102 may include ports 108, 110, 112, 116, 118. Each of the ports may be an upstream port, a downstream port, or a configurable port that may be designated as an upstream or downstream port. In the example of FIG. 1, port 108 may be an upstream port while ports 110, 112, 116, 118 may be downstream ports. Each of the ports may be configurable as a host port or as a device port. In one embodiment, ports 110, 112, 116, 118 may be configurable as a host port or as a device port.

Hub 102 may include a multi-host bridge (MHB) 106. MHB 106 may include analog circuitry, digital circuitry, multiplexers, or other suitable elements to bridge communication between downstream and upstream ones of ports 108, 110, 112, 116, 118. In particular, MHB 106 may be configured to bridge communication between USB hosts connected to ports 108, 110, 112, 116, 118. Furthermore, MHB 106 may be configured to share access to USB devices to multiple USB hosts connected to the ports. MHB 106 may be selectively engaged in USB communication by core 104.

In one embodiment, MHB 106 may be selectively engaged in USB communication by core 104 based upon USB elements that attach to hub 102. As multi-host USB communication does not follow any USB standard, multi-host USB communication represents a deviation from operation according to USB standards. Thus, multi-host USB communication, through utilization of MHB 106, may be selectively engaged when deviation from USB standards is to be accomplished. The determination to selectively engage MHB 106 may be performed by hub 102.

Example elements that might connect to hub 102 are illustrated in FIG. 1. A USB host, such as a head unit 120 of an automobile, may connect to hub 102 through an upstream port, such as port 0 108. One or more USB devices, such as a memory chip 122, may connect to hub 102 through a downstream port, such as port 1 110. A display 126 may connect to hub 102 through a downstream port such as port 2 112. In one embodiment, another element capable of connecting to hub 102 as a USB host may be connected thereto. In a further embodiment, such an element may also be capable of connecting to hub 102 as a USB device. For example, a smart phone 124 may be connected to hub 102 through downstream port 4 118. Phone 124 may be configured to operate as a USB device or as a USB host.

Hub 102 may be configured to utilize MHB bridge 106 to allow transfer of data in USB format or protocol between multiple hosts, such as head unit 120 and phone 124 (when connected as a host). Furthermore, hub 102 may be configured to allow multiple hosts to access USB devices connected to hub 102, such as memory chip 122 or display 126.

Phone 124 may access hub 102 and request communication with a USB host such as head unit 120 or may request control of USB device elements such as memory chip 122 or display 126. To a user of system 100, head unit 120 may appear to be the owner of or in control of such USB device elements. Accordingly, phone 124 may request apparent control of elements otherwise controlled by head unit 120. A user of system 100 may then use phone 124 to control various peripherals or components that otherwise are controlled by head unit 120. Such a process may be implemented according to the "CARPLAY" protocol offered by the assignee of the present disclosure. Subsequently, applications operating on phone 124 may use USB devices and peripherals of hub 102, as well as other elements of head unit 120. Such use may be accomplished by selectively engaging MHB 106 to share USB devices among multiple hosts (head unit 120 and phone 124) or by facilitating USB communication from host to host (head unit 120 and phone 124). In such cases, head unit 120 may allow phone 124 to act as-if it is the only USB host with respect to associated USB devices or USB host-to-host communication. In one embodiment, head unit 120 may allow phone 124 to operate under such conditions without head unit 120 becoming itself a USB device. In contrast, standards such as USB On-the-Go (OTG) would force head unit 120 to become a USB device in such conditions. Furthermore, OTG and similar protocols do not work with USB hubs such as hub 102 in the middle of such connections.

In order for phone 124 to control head unit 120, or at least communicate as such to head unit 120, or to control peripherals such as USB devices connected to hub 102, phone 124 may be required to be a USB host. At a minimum, in such a case phone 124 may be required to operate as-if it is the only USB host connected to hub 102. As phone 124 may follow USB standards, it may operate under the assumption that, when it is in a host mode, it is the only USB host in connection with other USB elements, which would be in USB device mode. There is no provision in the USB standards for multiple hosts. As discussed above, in such a situation MHB 106 may be selected by hub 102 for communication between phone 124 and head unit 120, memory chip 122, or phone 124. MHB 106 may, when engaged, operate between phone 124 and head unit 120 and make both USB elements appear as USB devices (as opposed to USB hosts) to the other element. Appearance of head unit 120 may be spoofed such that it appears as a USB device to phone 124. Moreover, appearance of phone 124 may be spoofed such that it appears as a USB device to head unit 120.

In one embodiment, system 100 may automatically perform the engagement of MHB 106 to perform host-to-host communication or sharing of a device to multiple hosts.

When phone 124 is connected to hub 102, phone 124 may identify itself as compatible with host-to-host communication or sharing of a device to multiple hosts, provided that hub 102 facilitates such communication. Phone 124 may then switch from device mode to host mode. In one embodiment, hub 102 may then switch handling of communication with phone 124 to host-to-host or device-to-multiple-hosts using MHB 106. Thus, handling may be switched automatically. Moreover, hub 102 may switch port 118 to device mode. This may be in contrast to, for example, waiting for head unit 120 to inform hub 104 that hub 102 is to switch port 4 118 to device mode, or that MHB 106 is to be attached to the respective ports. Subsequently, both head unit 120 and phone 124 may see MHB 106 as a device. Head unit 120 and phone 124 may communicate to MHB 106 as a device. MHB 106 may, in turn, translate the operations between head unit 120 and phone 124, or requests from head unit 120 and phone 124 of other USB elements.

After phone 124 is disconnected from hub 102, hub 102 may disconnect use of MHB 106. This may be performed automatically, as opposed to hub 102 informing head unit 120 about the disconnect event and waiting for head unit 120 to remove MHB 106 from the respective ports. Hub 102 may then reenter normal USB operations.

In other implementations, head unit 120 may recognize that phone 124 has attached to a downstream port, recognize phone 124 as a device that can switch between host and device mode, command phone 124 to become a host, command hub 102 to switch the port for phone 124 into device mode, and command hub 102 to use MHB 106 for subsequent communication. However, in such implementations, makers of a given instance of hub 102 must coordinate with each maker of a given instance of head unit 120 to establish a command set, timing diagrams, and other practical implementation details. Such implementations require that head unit 120 include or add commands, application programming interface (API) calls, functions, libraries, software stack elements, or other functionality for switching modes of hub 102. Furthermore, the implementations require that phone 124 detach from the port as a device and reattach as a hose at the same time that the associated port of hub 102 switches from host to device. This requires synchronization of operation between issuance of the command from head unit 120 and performance of phone 124 and hub 102. Failure to switch both sides within a required window of time may lead to contention, wherein two or zero USB hosts are active. Furthermore, head unit 120 may exist in legacy installations and a variety of installations with different timing. The variance of timing is problematic as all switching in such implementations is initiated by head unit 120.

In contrast, in one embodiment hub 102 may automatically perform switching in order to facilitate host-to-host or device-to-multiple-host USB communication. In a further embodiment, hub 102 may automatically engage use of MHB 106 for host-to-host or device-to-multiple-host USB communication. Hub 102 may automatically take such steps without the need for an instruction to switch modes from head unit 120.

In one embodiment, hub 102 may initialize downstream ports, such as port 1 110, port 1 110, port 1 116, and port 1 118, as host ports. In another embodiment, core 104 may include components for establishing a USB host. These components may be referred to as a minihost. The minihost may spoof itself as a USB device to USB hosts that attach, such as head unit 120 or phone 124.

In one embodiment, core 104 may then identify if and when phone 124 has attached to one of the downstream ports. In some protocols used by USB hosts requesting control of USB devices from other USB hosts, or requesting communication with other USB hosts, the USB host may first attach to hub 102, then disconnect, and then reattach as a host. The initial connect may have been as a device. Accordingly, in another embodiment, core 104 may then identify if and when phone 124 has detached from the downstream port. In a further embodiment, upon seeing the disconnect, core 104 may switch the port from which phone 124 disconnected to a device port. In another, further embodiment, core 104 may set a timer upon switching the port to a device port. The timer may be set for a period in which phone 124 would be expected to reattached. In yet another, further embodiment, if the timer expires without detection of a host attachment (in particular, phone 124), core 104 may assume that the disconnect was a full detachment, such as a user removing or unplugging phone 124 from system 100. In such a case, core 104 may return the port in question to a host port. However, if there is a host attachment detected during the period set by the timer, core 104 may maintain the port in question as a device port. In a further embodiment, core 104 may attach MHB 106 to the port in question if the host attachment occurs during the period set by the timer. Subsequently, MHB 106 may perform host-to-host or shared-device USB communication.

In such embodiments, makers of hub 102 or phone 124 might not need to coordinate with makers of head unit 120 to modify the commands of head unit 120 to interface with hub 102 to change operation of hub 102 with respect to engagement of MHB 106. Furthermore, the service life of a head unit 120 is long compared to that of other USB elements. New versions of phone 124 or other USB hosts that have different timing requirements will not require changes to head unit 120 with respect to establishing host-to-host or shared-device USB communication. Reconnects may be recognized more quickly, as in such embodiments a reconnect may be recognized by hub 102 and MHB 106 applied, rather than waiting on other timing issues for head unit 120 to resolve. In such embodiments, automatic switching can be implemented by monitoring data traffic between head unit 120 and phone 124, wherein line impedances are monitored.

By performing automatic switching in hub 102, customizations to software or firmware in head unit 120 may be avoided in order to allow host-to-host or shared-device USB communication between head unit 120 and phone 124. A user may plug in phone 124 to system 100 and subsequently phone 124 may control, or at least appear to control, USB elements of system 100 such as display 126 or memory chip 122. However, head unit 120 need not give up complete control, as head unit 120 may still remain a host, rather than a device. Upon a subsequent need for USB elements of system 100 such as display 126 or memory chip 122, control may be given back to head unit 120 through MHB 106. Such a need may include, for example, switching control of display 126 from displaying information of phone 124 applications to a back-up camera feed from head unit 120 when an automobile is put into a reverse gear.

Communication between phone 124 and head unit 120 may still occur, even though hub 102 may perform automatic switching of modes of ports and bridging. For example, when phone 124 connect to hub 102, hub 102 may relay messages from phone 124 to head unit 120 that phone 124 wants to connect as a USB host. Hub 102 may relay such messages without changing such messages. As described above, hub 102 may initiate a timer after phone 124 subsequently disconnects. Reconnection as a USB host should occur within a few hundred milliseconds. Head unit 120 may operate communication with phone 124 in a protocol that operates as its own application. Head unit 120 may maintain its USB host status. However, head unit 120 might not have to issue a command to hub 102 to switch the ports associated with phone 124. Instead, hub 102 may handle such switching automatically upon observing the operation and communication of phone 124. In some embodiments, head unit 120 may response to phone 124 with an acknowledgement or other message. Such a message may lead phone 124 to assume that head unit 120 will operate as a device. However, instead head unit 120 may continue to operate as a host but host-to-host or shared-device USB communication is handled by MHB 106. Head unit 120 may thus acknowledge the request of phone 124 to operate as a USB host, but head unit 120 might not change its operation accordingly to switch from USB host mode.

A port of hub 102 may be considered a host port when hub 102 is to act as a host in relation to whatever USB elements attach thereto. A port of hub 102 may be considered a device port when hub 102 is to act as a device in relation to whatever USB element is connected to the port.

Figure 2:
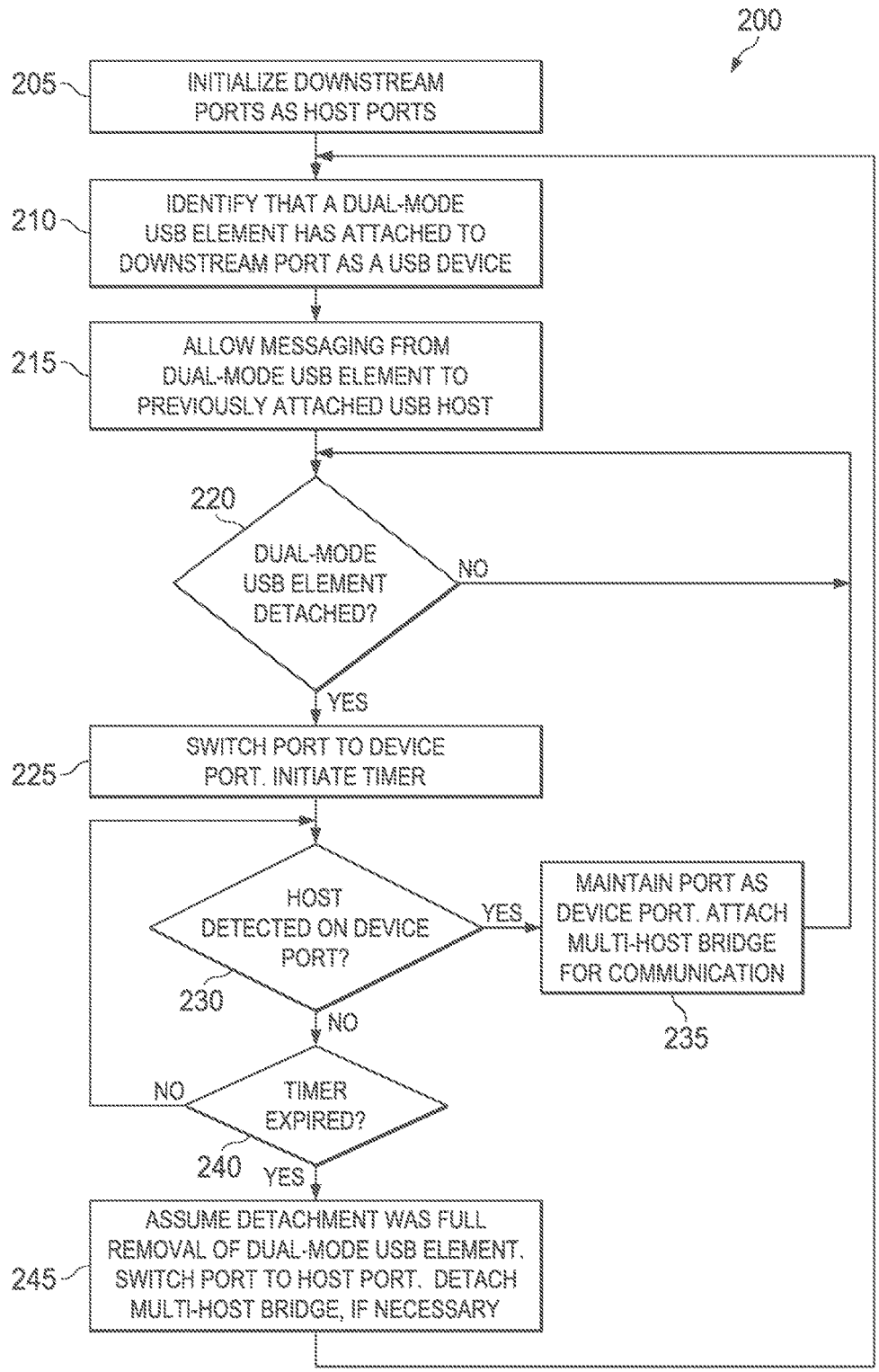
FIG. 2 is an illustration of a method for automatic switching of USB operation, according to embodiments of the present disclosure.

FIG. 2 illustrates an example method 200 for automatically switching operational modes of USB, according to embodiments of the present disclosure. Method 200 may be performed, for example, by elements of FIG. 1, such as hub 102 or core 104. Method 200 may be implemented in analog circuitry, digital circuitry, instructions for execution by a processor, or any suitable combination thereof. Method 200 may be executed in any suitable order and may be initiated at any suitable step. Moreover, method 200 may be initiated with more or less steps than are shown in FIG. 2. Particular steps in method 200 may be optionally repeated, omitted, executed in parallel with one another, or executed recursively.

At 205, the downstream ports of a USB hub may be set as host ports. A USB host, such as a head unit, may be connected to an upstream port of the USB hub.

At 210, it may be identified that a dual-mode USB element has attached to one of the downstream ports. The USB element may have attached as a device. The USB element may be capable of acting as a USB host or as a USB device. The USB element may include, for example, a smart phone, laptop, or other electronic device.

At 215, messaging may be performed from the dual-mode USB element to the USB host that is attached to the USB host. The USB host may allow such messaging without altering or interrupting. The messaging may be performed using USB protocols between a USB device and a USB host. Other USB-protocol-compliant messaging may be performed.

At 220, it may be determined whether the dual-mode USB element has detached. In one embodiment, any detachment of a USB element from a downstream port may be monitored, regardless of whether the element that detached was specifically a dual-mode USB element. If the USB element has not detached, 220 may repeat. If the USB element has detached, method 200 may proceed to 225.

At 225, the port from which the detachment occurred may be switched to a device port. A timer may be initiated. The timer may be set to a time by which an instance of a dual-mode USB element would reattach to assert itself as a host. Furthermore, the timer may be set to a time by which it is unlikely that a different USB element would attach to the port in question. If a USB element attaches to the port in question after the timer, the USB element may be handled as a new USB element attaching for the first time, rather than the dual-mode USB element detaching and reattaching. The time period may be, for example, approximately 500 milliseconds.

At 230, it may be determined whether a host has been detected on the port that was switched to a device port. If there has not been a host detected, method 200 may proceed to 240. If a host has been detected on the port that was switched to the device port, method 200 may proceed to 235.

At 235, it may be determined that the same dual-mode USB element has reattached to the port. The port may be maintained as a device port. The USB hub may engage or attach a multi-host bridge for communication to the device port. The multi-host bridge may translate USB host-to-host communication between the dual-mode USB element and the previously attached USB host. The multi-host bridge may facilitate sharing of USB device, such as displays or memory, between the dual-mode USB element and the previously attached USB host. Such communication may continue as needed until, for example, the dual-mode USB element or the previously attached USB detaches. Method 200 may return to 220.

At 240, it may be determined whether the timer has expired without the dual-mode USB element reattaching, or a host detected on the port that was switched. If the timer has expired, method 200 may proceed to 245. If the timer has not expired, method 200 may return to 230.

At 245, it may be determined that the detachment was a full removal of the dual-mode USB element. Accordingly, the port at which the dual-mode USB element was attached may be switched back to host mode. The multi-host bridge may detached, if it was engaged. Method 200 may return to 210.

At any suitable point in method 200, method 200 may optionally terminate. Moreover, at any suitable point in method 200, the previously attached USB host may assert control over shared USB elements. This may be performed, for example, on an interrupt basis.

While embodiments of the invention are susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

The invention claimed is:

1. A universal serial bus (USB) hub, comprising:
   an upstream port configured to be communicatively coupled to a USB host;
   a first downstream port;
   a USB hub core circuit configured to:
   determine a detachment from the first downstream port;
   determine whether a USB element has reattached to the first downstream port in USB host mode;
   based on a determination that the USB element has reattached to the first downstream port in USB host mode, perform USB multi-host bridging for the USB host and the USB element;
   initialize a timer based upon the determination of the detachment from the first downstream port; and
   reconfigure the first downstream port as another upstream port and perform USB multi-host bridging for the USB host and the USB element further based upon a determination that the USB element has reattached to the first downstream port in USB host mode before expiration of the timer.

2. The USB hub of claim 1, wherein the USB multi-host bridging includes performing host-to-host communication between the USB host and the USB element.

3. The USB hub of claim 1, wherein the USB multi-host bridging includes sharing access to USB devices between the USB host and the USB element.

4. The USB hub of claim 1, wherein the USB hub core circuit is configured to perform USB multi-host bridging by attaching a multi-host bridge to the first downstream port.

5. The USB hub of claim 1, wherein the USB multi-host bridging includes attaching a USB multi-host bridge to the first downstream port.

6. The USB hub of claim 1, wherein the USB hub core circuit is further configured to initialize the first downstream port and one or more second downstream ports as host ports before the determination of detachment from the first downstream port, wherein configuring a given port as a host port includes configuring the USB hub to act in USB host mode to an apparatus connecting to the USB hub through the given port.

7. The USB hub of claim 1, wherein the USB element is configured to operate as a dual-mode USB element, capable of selectively attaching in USB host mode or in USB device mode.

8. The USB hub of claim 1, wherein the USB hub core circuit is further configured to, upon determining that the detachment from the first downstream port, switch the first downstream port to a device port, wherein configuring a given port as a device port includes configuring the USB hub to act in USB device mode to an apparatus connecting to the USB hub through the given port.

9. The USB hub of claim 1, wherein the USB hub core circuit is further configured to, upon determining that the timer has expired, switch the first downstream port to a host port, wherein configuring a given port as a host port includes configuring the USB hub to act in USB host mode to an apparatus connecting to the USB hub through the given port.

10. The USB hub of claim 1, wherein the USB hub circuit is further configured to, upon determining that a USB element has reattached to the first downstream port, maintain the first downstream port as a device port, wherein configuring a given port as a device port includes configuring the USB hub to act in USB device mode to an apparatus connecting to the USB hub through the given port.

11. The USB hub of claim 1, wherein the USB hub circuit is further configured to halt performing USB multi-host bridging for the USB host and the USB element upon a request from the USB host for control of one or more shared USB elements.

12. One or more non-transitory machine readable media comprising instructions, the instructions, when read and executed by a processor, cause the processor to:
- monitor an upstream port configured to be communicatively coupled to a USB host;
- monitor a first downstream port;
- determine a detachment from the first downstream port;
- determine whether a USB element has reattached to the first downstream port in USB host mode;
- based on a determination that the USB element has reattached to the first downstream port in USB host mode, perform USB multi-host bridging for the USB host and the USB element;
- initialize a timer based upon the determination of the detachment from the first downstream port; and
- reconfigure the first downstream port as another upstream port and perform USB multi-host bridging for the USB host and the UST element further based upon a determination that the USB element has reattached to the first downstream port in USB host mode before expiration of the timer.

13. The media of claim 12, wherein the USB multi-host bridging includes performing host-to-host communication between the USB host and the USB element.

14. The media of claim 12, wherein the USB multi-host bridging includes sharing access to USB devices between the USB host and the USB element.

15. The media of claim 12, further comprising instructions to perform USB multi-host bridging by attaching a multi-host bridge to the first downstream port.

16. The media of claim 12, wherein the USB multi-host bridging includes attaching a USB multi-host bridge to the first downstream port.

17. The media of claim 12, further comprising instructions to initialize the first downstream port and one or more second downstream ports as host ports before the determination of detachment from the first downstream port, wherein configuring a given port as a host port includes configuring the USB hub to act in USB host mode to an apparatus connecting to the USB hub through the given port.

18. The media of claim 12, further comprising instructions to operate as a dual-mode USB element, capable of selectively attaching in USB host mode or in USB device mode.

19. The media of claim 12, further comprising instructions to, upon determining that the detachment from the first downstream port, switch the first downstream port to a device port, wherein configuring a given port as a device port includes configuring the USB hub to act in USB device mode to an apparatus connecting to the USB hub through the given port.

20. The media of claim 12, further comprising instructions to, upon determining that the timer has expired, switch the first downstream port to a host port, wherein configuring a given port as a host port includes configuring the USB hub to act in USB host mode to an apparatus connecting to the USB hub through the given port.

21. The media of claim 12, further comprising instructions to, upon determining that a USB element has reattached to the first downstream port, maintain the first downstream port as a device port, wherein configuring a given port as a device port includes configuring the USB hub to act in USB device mode to an apparatus connecting to the USB hub through the given port.

22. The media of claim 12, further comprising instructions to halt performing USB multi-host bridging for the USB host and the USB element upon a request from the USB host for control of one or more shared USB elements.

* * * * *

UNITED STATES PATENT AND TRADEMARK OFFICE
CERTIFICATE OF CORRECTION

PATENT NO. : 10,331,604 B2  
APPLICATION NO. : 15/901937  
DATED : June 25, 2019  
INVENTOR(S) : Atish Ghosh et al.

Page 1 of 1

It is certified that error appears in the above-identified patent and that said Letters Patent is hereby corrected as shown below:

Column 5,  
Detailed Description, Line 28, "…which phone 124 would be expected to reattached…"  
---Change to--- "…which phone 124 would be expected to reattach…"

Signed and Sealed this  
Thirtieth Day of July, 2019

Andrei Iancu  
*Director of the United States Patent and Trademark Office*